United States Patent Office 3,639,582
Patented Feb. 1, 1972

3,639,582
ANTIBIOTIC LASPARTOMYCIN
Hamao Umezawa, Masa Hamada, Hiroshi Naganawa, Tomio Takeuchi, Kenji Maeda, and Yoshiro Okami, Tokyo, Japan, assignors to Zaidan Hojin Biseibutsu Kagaku Kenkyu Kai, Tokyo, Japan
Filed Apr. 4, 1968, Ser. No. 718,671
Claims priority, application Japan, Apr. 14, 1967, 42/23,397
Int. Cl. A61k 21/00
U.S. Cl. 424—118
4 Claims

ABSTRACT OF THE DISCLOSURE

This invention relates to a process for the production of laspartomycin by fermentation method which comprises cultivating a strain of Streptomyces viridochromogenes var. komabensis in an aqueous carbohydrate solution containing a nitrogenous nutrient under submerged aerobic condition until substantial antibacterial activity is imparted to said solution and then recovering said laspartomycin from said solution.

---

This invention relates to a new and useful antibiotic substance called laspartomycin, and its production. More particularly, this invention relates to processes for the production of laspartomycin by fermentation methods and for its recovery and purification. The invention embraces this antimicrobial agent and its salts in dilute solutions, was produced and extracted as crude concentrates, as crude solids, as purified solids. Laspartomycin has low toxicity and is effective in inhibiting growth of Gram positive bacteria including Staphylococci. This substance exhibits a therapeutic effect on infections of the sensitive bacteria, and is useful for chemotherapy of the infections in humans and animals.

This is now provided, according to the present invention, an antibiotic substance (and its salts and especially its nontoxic, pharmaceutically acceptable salts) effective in inhibiting Gram-positive bacteria, said antibiotic being soluble in water and lower alcohols, and scarcely soluble in esters, acetone, benzene, and ethers, exhibiting no absorption maximum in ultraviolet from 220 m$\mu$ to 440 m$\mu$ except the end absorption, giving a weakly positive ninhydrin and biuret reactions, giving the result of the elemental analysis of C, 53.96%; H, 7.61%; N, 13.07%: O, 25.22%; exhibiting levorotation of $[\alpha]_D^{20}$ —17.5° in 1% methanol solution, giving nine ninhydrin positive products after the acid hydrolysis, moving to the cathode on paper electrophoresis using pH 6.5 pyridine-acetate buffer, having an isoelectric point at pH 2.6, decomposing at about 199° C., being stable in the solutions of pH 2, 5, 7, 9, 0.1 N hydrochloric acid and 0.1 N sodium hydroxide, exhibiting characteristic bands in the infrared absorption spectrum when mulled in potassium at the following wave numbers in cm.$^{-1}$: 3330, 3060, 2940, 1730, 1660, 1530, 1440, 1340, 1230, 1175, 1025, 1005, 980, 925, 870, and 850.

Figure 1:
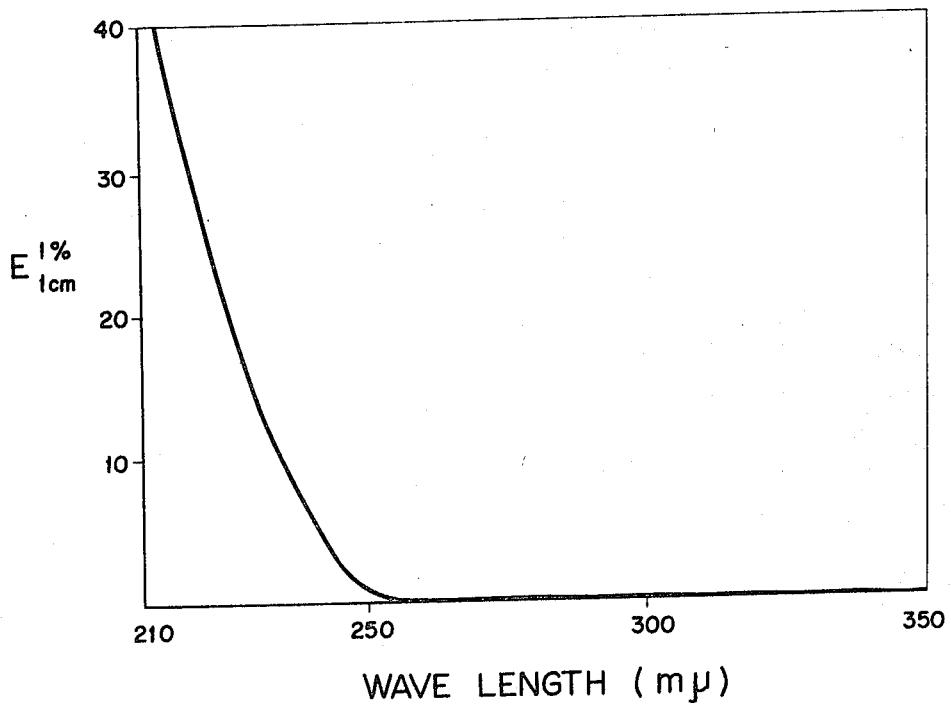
Figure 2:
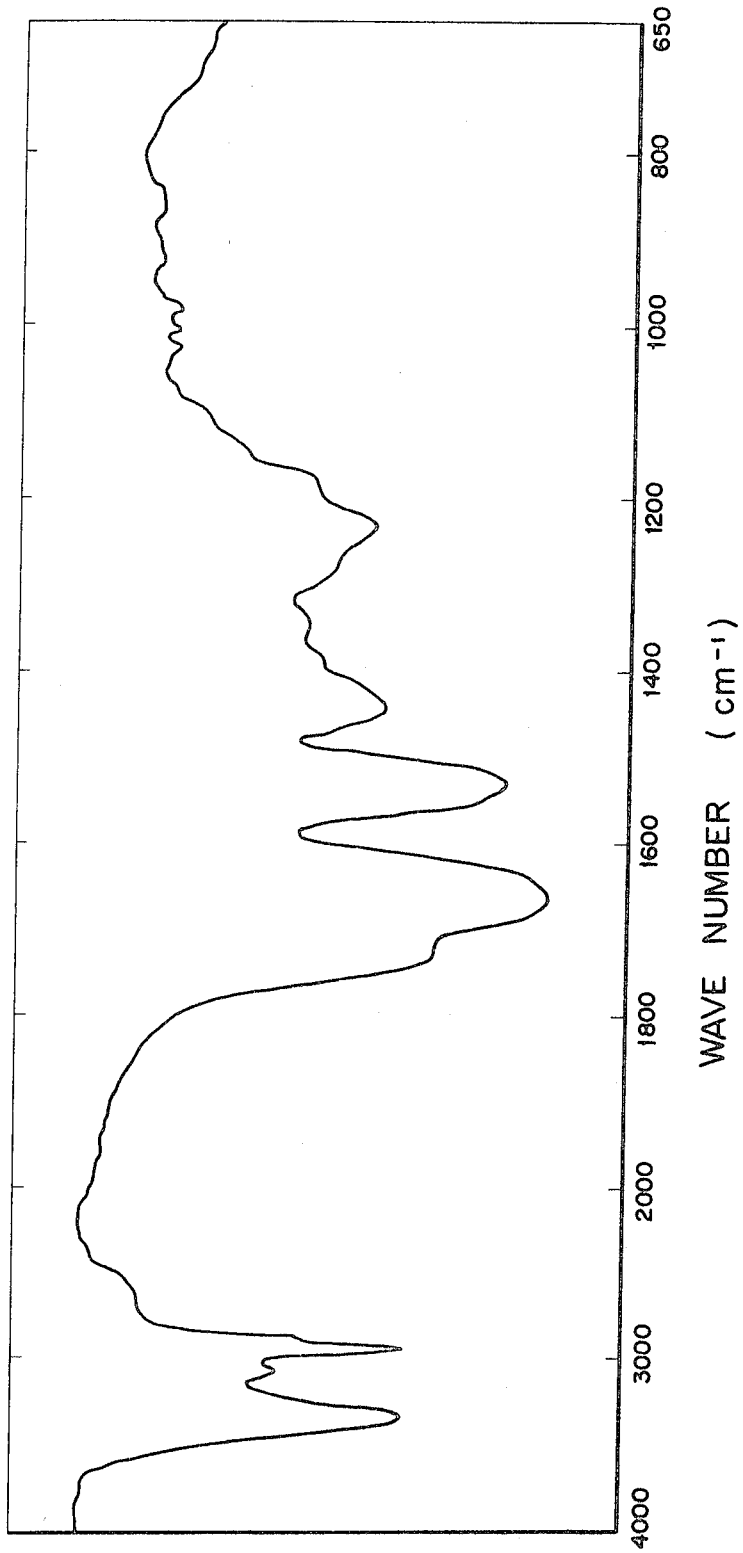
Figure 3A:
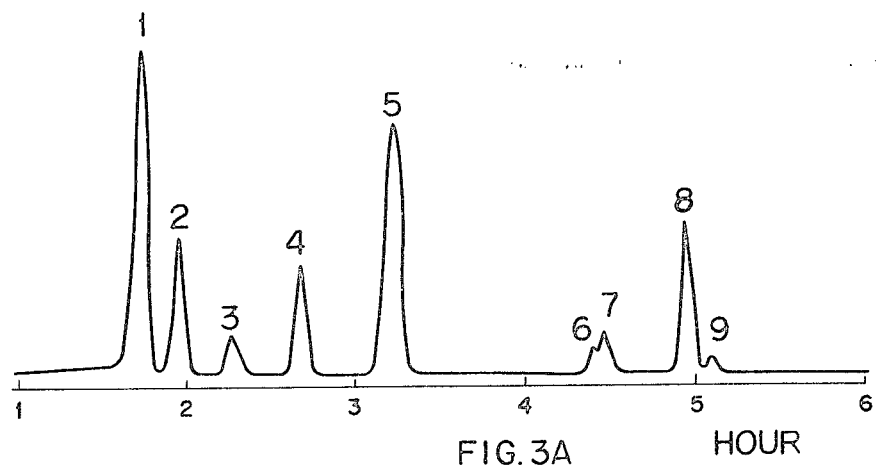
Figure 3B:
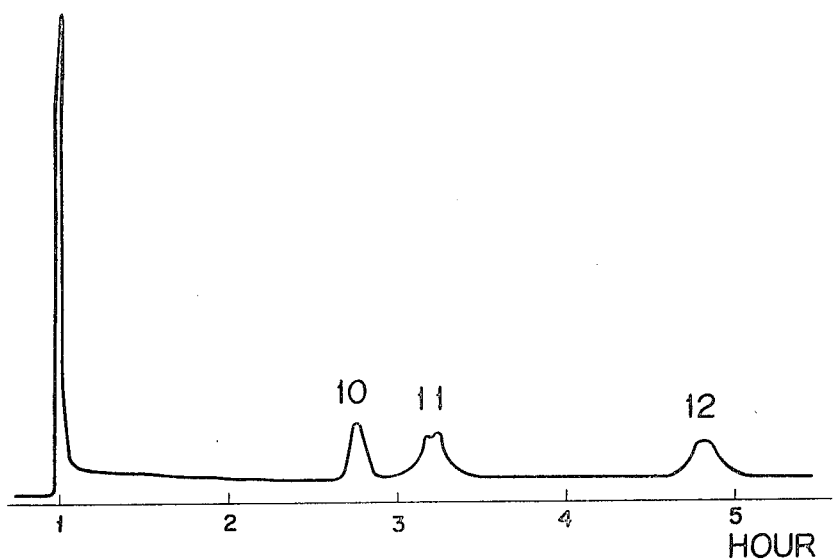

Referring to the drawings:
FIG. 1 is the ultraviolet spectrum of laspartomycin in the aqueous solution (50 mcg./ml.).
FIG. 2 is the ultraviolet spectrum of laspartomycin pelleted in potassium bromide.
FIG. 3(A) and FIG. 3(B) are the charts of amino acid analysis of acid hydrolysate of laspartomycin.

There is further provided according to the present invention the process for the production of the antibiotic laspartomycin which comprises cultivating a strain of Streptomyces viridochromogenes var. komabensis in media containing carbon sources and nitrogen sources under aerobic conditions until a substantial amount of laspartomycin is accumulated in said solution.

Laspartomycin is a new antibiotic discovered by the inventors. The organism producing the antibiotic was first found by the present inventors and was isolated from a sample of soil collected at the campus of the junior course of Tokyo University in Meguro-ku, Komaba, Tokyo, in May 1963, and was designated as a new variant of Streptomyces viridochromogenes. It is transferred on glycerol-ammonium agar. To this strain the laboratory No. M307–M5 was given and this strain has been deposited in National Institute of Health, Japan, Shinagawa-ku, Tokyo as NIHJ No. MC–5–42 which distributes this strain on the request of the scientific study of this strain and the compounds produced by it.

The strain No. M307–M5 has the following characteristics:

(1) Microscopic observation: Substrate mycelia branch monopodially and produce aerial mycelia in which closed spiral structure is observed but not whorl structure.

(2) Glycerol-Czapek agar (incubated at 27° C.): Colorless to pale yellowish brown growth is later shaded with dusty rose (8 ie Color Harmony Manual: published by Container Corporation of America, Chicago) or with light brown color. White aerial mycelia develop. Faintly violet-colored or faint yellowish soluble pigment is often produced. Reverse of the growth is yellowish brown or reddish brown.

(3) Krainsky glucose asparagine agar (incubated at 27° C.): Colorless growth turns to pale yellow and is gradually shaded with reddish to reddish brown tone (Dusty Rose 8 ie by Color Harmony Manual). In some cases, colorless growth turns to pale yellow or pale yellowish brown. Aerial mycelium is white or shaded with bluish tinge (Lt. Aqua 18 ec, by Color Harmony). No or slightly yellowish soluble pigment is produced. Reverse of the growth is yellowish brown or brown.

(4) Calcium malate agar (incubated at 27° C.): Growth is colorless to pale yellow. Aerial mycelium is white or shaded with bluish tinge. No soluble pigment is produced. Calcium malate around the growth is solubilized. Reverse of the growth is cream-colored.

(5) Peptone solution containing 1.0% sodium nitrate (incubated at 27° C.): Colorless growth is observed. No aerial mycelium and no soluble pigment are produced. Nitrite is not formed from nitrate.

(6) Potato plug (incubated at 27° C.): Colorless growth turns to yellowish brown or dark yellowish brown with many wrinkles. In some cases, color of the growth is shaded with violet color after around 2 days' cultivation. Aerial mycelium is thin and white. Soluble pigment is light brownish.

(7) Starch agar plate (incubated at 27° C.): Colorless growth is later shaded with purple tinge and further becomes dark red (Old Wine 8 ng, by Color Harmony Manual). In some cases, it becomes pale yellow or brownish yellow. Aerial mycelium is white or shaded with bluish tinge (Lt. Aqua 18 ec, by Color Harmony Manual). No or slightly yellowish soluble pigment is produced. Reverse of the growth is yellowish brown or reddish brown. Hydrolysis of starch is weak.

(8) Nutrient agar (incubated at 37° C.): Colorless growth turns to pale brownish. No aerial mycelium is observed. Brown soluble pigment is produced.

(9) Nutrient agar (incubated at 27° C.): Colorless growth turns to light brown or reddish brown and is later shaded with grayish brown color. No aerial mycelium is observed. Brown soluble pigment is produced.

(10) Loeffler coagulated serum (incubated at 37° C.): Colorless growth turns to pale brown or yellowish brown. No aerial mycelium is observed. Light brown to reddish brown soluble pigment is produced. Coagulated serum is not liquefied.

(11) Gelatin stab (incubated at 20° C.): Colorless to light brown growth is observed, but no aerial mycelium. Brown soluble pigment is produced. Liquefaction of gelatin is positive.

(12) Milk (incubated at 37° C.): Growth on the surface is colorless to yellowish brown. No aerial mycelium is observed. Yellowish brown soluble pigment is produced. Medium to strong coagulation and peptonization of milk are observed.

(13) Tyrosine agar (incubated at 27° C.): Growth is colorless to brownish. No aerial mycelium is observed. Soluble pigment with blackish tinge is produced. Tyrosinase reaction is positive.

(14) Czapek solution containing cellulose as the sole carbon source (incubated at 27° C.): Growth is colorless. Decomposition of cellulose is not observed.

(15) Utilization of carbon sources in Pridham-Gottlieb basal medium (incubated at 27° C.): Positive growth with glycerol, arabinose, xylose, rhamnose, galactose, glucose, mannose, fructose, mannitol, inositol, lactose, maltose, sucrose, raffinose, salicin, dextrin, inulin and starch. No or slight growth with sorbitol and dulcitol.

As shown by the characteristics described above, the strain M307–M5 belongs to the genus Streptomyces, and its characteristics can be summarized as follows: no whorl; closed spiral; spiny structure on surface of spore; yellowish brown to light brown (purplish tinge in some cases) growth; white aerial mycelium shaded with bluish tinge; chromogenic type which produces brownish soluble pigment on organic media but no or slightly yellowish one on synthetic media; cream-colored, yellowish brown, brown or reddish brown reverse of the growth; medium to strong proteolytic activity; weak hydrolysis of starch.

Among known species, the strain No. M307–M5 has most many common characteristics with the group of *Streptomyces viridochromogenes* (Krainsky 1914) Waksman and Henrici, 1948: (The Actinomycetes, vol. 2, p. 287, William and Wilkins, Baltimore). Of this group, *Streptomyces viridochromogenes* is different from the strain No. M307–M5 in respect of greenish to blackish pigmentation of the growth and its reverse. The group of *Streptomyces viridochromogenes* and related species have been referred intensely by R. E. Bennett in J. Bacteriology, vol. 85, p. 681, 1963. Comparing with the species described in these references, the strain No. M307–M5 is found to be related with *Streptomyces chartreusis* Calhoun and Johnson, 1956 (The Actinomycetes, vol. 2, p. 192), *S. coerulescens* Gauze et al., 1957, *S. coeruleorubidus* Gauze et al., 1957 and *S. coeruleofuscus* Gauze et al., 1957. Comparison of the strain No. M307–M5 with these four species is shown in the following table.

*S. coerulescens*. However, the strain No. M307–M5 is different from *S. chartreusis* in respects of proteolytic activity, no reduction of nitrate and hydrolysis of starch, from *S. coerulescens* in pattern of carbohydrate utilization, and from the rest strains in the color of the aerial mycelium and in violet (red) growth on some media. Thus the strain No. M307–M5 was designated as *Streptomyces viridochromogenes* var. *komabensis*.

Variation or mutation of the above described organism is naturally expected since such is a common property of streptomyces. *Streptomyces viridochromogenes* var. *komabensis* in this invention includes the typical strain described above, and all natural and artificial variants and mutants thereof. That is, by definition *Streptomyces viridochromogenes* var. *komabensis* includes all strains producing laspartomycin except those which can be absolutely differentiated therefrom.

*S. viridochromogenes* var. *komabensis* when grown under a suitable condition produces laspartomycin. A fermentation broth containing laspartomycin is prepared by inoculating spores or mycelia of the laspartomycin-producing organism into a suitable medium and then cultivating under aerobic condition. For the production of laspartomycin, the cultivation on a solid medium is possible but for production of large quantities cultivation on a liquid is preferred. Any fermentation temperature can be employed within the range in which laspartomycin-producing organism can grow and produces laspartomycin although 25–35° C. is preferred. Media consisting of known kinds of nutritional sources for actinomycetes are useful for the production of laspartomycin. For example, commercial products such as starch, dextrin, glucose, glycerol, maltose, saccharose, lactose, oil, fat and molasses in pure or crude states are useful as the carbon source. The commercially available products such as soybean powder, distiller's soluble, peanut powder, cotton seed powder, meat extract, peptone, fish powder, yeast extract, corn steep liquor and casein are useful as the nitrogen source. If necessary, inorganic nitrogen sources such as ammonium nitrate, inorganic salts such as sodium chloride, phosphates, magnesium salts, calcium carbonate and small amount of heavy metals are added. Any kinds of constituents which are known to be utilized by microorganisms can be used. Antifoams such as silicone resins, fats, etc. are useful, and all known methods for the production of antibiotics such as penicillin, streptomycin, etc. by fermentation can be applied.

The fermentation is continued until laspartomycin is substantially accumulated. For example, when the strain No. M307–M5 was inoculated to a medium (pH 7.0) containing 1% starch, 1% glucose, 1.5% soy-bean meal, 0.1% $K_2HPO_4$, 0.1% $MgSO_4 \cdot 7H_2O$ and 0.3% NaCl, and shake-cultured on the fifth day of the culture, 100 mcg./

Comparison of the strain M307–M5 with *S. viridochromogenes*, *S. chartreusis*, *S. coerulescens*, *S. coeruleorubidus* and *S. coeruleofuscus*

|  | M307–M5 | S. chartreusis | S. coerulescens | S. coeruleorubidus | S. coeruleofuscus | S. viridochromogenes |
|---|---|---|---|---|---|---|
| Spiral | Closed spirals | Short tight spirals to loose open spirals. | Short spirals | Long open spirals. | Short open spirals (some closed spirals). | Open or compact spirals. |
| Color of aerial mycelium | White to bluish-white to bluish. | Bluish gray to blue-green. | Blue to blue-green. | Blue to blue-green. | Blue to bluish gray. | Blue to blue-green. |
| Color of reverse | Cream color, yellowish brown, brown, reddish-brown. | Cinnamon, light amber. | Brown | Reddish brown | Brown | Bluish green to greenish black |
| Surface of spore | Spiny | Spiny | Spiny | Spiny | Spiny | Spiny. |
| Antibiotic produced | Laspartomycin | Chartreusin | Coerulomycin | — | — | Antifungal activity. |
| Chromogenicity | + | + | + | + | + | + |
| Nitrate reduction | — | + | — | + | + | + or — |
| Util. of carbohyd.: |  |  |  |  |  |  |
| Sorbitol | — | — | — | — | — | — |
| Raffinose | + | + | — | — | + | — |
| Proteolysis | Medium to strong. | Slow |  |  |  | + |
| Hydrolysis of starch | Weak | Good |  |  |  | + |

As seen in the table, the strain No. M307–M5 is related to *S. chartreusis*, one of the viridochromogenes group, and ml. of laspartomycin was produced. Glycerol, glucose and starch are examples suitable as carbon sources for production of laspartomycin and meat extract, peptone, soy-bean meal and corn steep liquor are examples of suitable nitrogen sources.

As likely as other known antibiotics, high production of laspartomycin can be achieved by selection of high productive single colony selection, with or without the treatment of various mutagens such as ultraviolet light, X-ray or chemical mutagens, and by selection of suitable medium and fermentation conditions for the high producing strains.

There is provided according to the present invention processes for extraction and purification of laspartomycin and its salt. Laspartomycin is soluble in water and exists mainly in liquid part of fermented broth but some does also in mycelial part. Laspartomycin in liquid part is transferred to water-immiscible lower alcohols such as 1-butanol at pH below 9.0. It is recommendable that its transfer from aqueous solution to solvent is made at pH 2.0 and its transfer from solvent to aqueous liquid is processed at pH 10-11. Laspartomycin in aqueous solution is precipitated by adjusting pH to 2.6. Laspartomycin and impurities in the fermented broth can be separated by adsorption or partition-chromatography depending on the difference in their affinity to adsorbing agent. It is adsorbed by alumina or silica gel, favourable by their columns and eluted with alcoholic solvents such as methanol, ethanol or butanol containing water, acetic acid or ammonia.

Laspartomycin is an acidic peptide soluble in water and lower alcohols but hardly soluble in other organic solvents. On the basis of this property of laspartomycin, its free acid or its salt is obtained in crude form or purified state by the procedures, such as precipitation, adsorption, partition, elution, or transfer to solvent.

The properties of laspartomycin are as follows: Laspartomycin is obtained as colorless powder of acidic peptide having an isoelectric point at about pH 2.6. It shows the decomposition at about 199° C., and weakly positive reactions of ninhydrin and biuret, and negative Molisch and anthrone. It decolorizes potassium permanganate solution. It is soluble in water (more than 20%), methanol, ethanol, and butanol, but hardly soluble in ethylacetate, butylacetate, ethyl ether, benzene, acetone or petroleum ether. Optical rotation in 1% methanol solution ($[\alpha]_D^{20°}$) is −17.5°. It has only end absorption of ultraviolet light. Elemental analysis of its free acid: C, 53.96%; H, 7.61%; N, 13.07%; O, 25.22%, no halogen and sulfur. Infrared spectrum of its KBr tablet shows following bands (cm.$^{-1}$): 3330, 3060, 2940, 1730, 1660, 1530, 1440, 1340, 1230, 1175, 1025, 1005, 980, 925, 870, and 850. On thin layer chromatography of silica gel, a single spot is detected by permanganate at $Rf$ values 0.14, 0.13, 0.45, 0.163, 0.58, and 0.78 with solvent systems of 1-butanol saturated with water, acetic acid-chloroform (2:1), secondary butanol-formic acid-water (75:15:10), n-propanol-acetic acid-chloroform (1:4:2), 1-butanol-acetic acid-water (4:1:2) and 1-butanol-pyridine-water (2:1:1), respectively. By ascending paper chromatography (Toyo filter No. 51) using 1-butanol-saturated with water, 5% NH$_4$Cl, 1-butanol-acetic acid-water (4:1:2) 1-butanol-pyridine-water (2:1:1), 1-butanol-pyridine-acetic acid-water (20:5:5:10) and benzene-methanol (4:1), laspartomycin shows a single spot shown by bioautography at $Rf$ value, 0.45, 0.23, 0.91, 0.41, 0.80, and 0.70, respectively. Hydrolysate of laspartomycin with 6 N HCl (at 105° C. for 20 hours) contains an oil with characteristic smell of fatty acids, and shows nine ninhydrin and isatin positive spots by two dimensional paper chromatography, that is, descending paper chromatography using 1-butanol-acetic acid-water (4:1:2) and high voltage paper electrophoresis using acetic acid-formic acid-water (75:25:900). By amino acids analysis, the hydrolysate gave 4 moles of aspartic acid, 1 mole of threonine, 4 moles of glycine, 1 mole of proline, 1 mole of pipecolic acid, 1 mole of isoleucine, 1 mole of $\alpha,\beta$-diamino-butyric acid, when proline contained was calculated as 1 mole. In addition to these amino acids, it gave two unknown amino acids, and one of them located in the same position as arginine, but this amino acid was not expected to be arginine, because of its negative Sakaguchi reaction. The results of amino acid analysis are shown in FIGS. 3(A) and (B). FIG. 3(A) shows the analysis of acidic and neutral amino acid when the hydrolysate of 1 mg. was applied to the column of 50 cm. with the flow rate of 30 cc./hr. FIG. 3(B) shows the analysis of basic amino acids when the hydrolysate of 1 mg. was applied to the column of 15 cm. with the flow rate of 30 cc./hr. Amino acid detected are as follows: (1) aspartic acid, (2) threonine, (3) unknown amino acid, (4) proline, (5) glycine, (6) valine, (7) pipecolic acid, (8) isoleucine, (9) leucine, (10) $\alpha,\beta$-diaminobutyric acid, (11) ammonia and (12) arginine, respectively. On the basis of the elemental analysis and the amino acid analysis, if 17 nitrogen atoms are assumed to be contained in laspartomycin, a tentative molecular formula of laspartomycin is calculated to be $C_{82}H_{137-139}N_{17}O_{29}$ and its molecular weight is 1825–1827. When laspartomycin in dilute hydrochloric acid was titrated with 1 N NaOH, its titration equivalent for neutralization was 455.38 and its molecular weight was estimated to be 1821.5.

The activity of laspartomycin in aqueous solution remained as follows. When it was kept at 60° C. for 30 minutes and the residual laspartomycin was assayed by *Micrococcus flavus* plate method: the residual activities in aqueous solution of pH 2, 5, 7, 9 and in 1 N HCl or 1 N NaOH after the treatment were 75%, 100%, 105%, 77%, 96% and 106%, respectively.

Toxic reaction was not shown by the intravenous injection of 5 mg. of laspartomycin to a mouse. When mice were infected with *Staphylococcus aureus* Smith strain and the intraperitoneal injection of 400 mcg., 100 mcg., 25 mcg., and 6.25 mcg. of laspartomycin per mouse was made 1.5 hrs. after the infection, then the injection of 40 mcg., 100 mcg. or 25 mcg. prevented the infection and all mice survived.

The antibacterial spectrum of laspartomycin is as follows (on nutrient agar medium, at 37° C. for 20 hrs.):

| Test organisms: | Minimum inhibitory concentration mcg./cc. |
|---|---|
| *Staphylococcus aureus* FDA 209–P, patent | 3.12 |
| *Staphylococcus aureus* FDA 209–P, kanatothricin-streptomycin resistant | 3.12 |
| *Staphylococcus aureus* FDA 209–P, streptomycin resistant | 3.12 |
| *Staphylococcus aureus* FDA 209–P, bryamycin resistant | 3.12 |
| *Staphylococcus aureus* FDA 209–P, novobiocin resistant | 3.12 |
| *Staphylococcus aureus* FDA 209–P, actinomycin resistant | 3.12 |
| *Staphylococcus aureus* 52–34, parent | 3.12 |
| *Staphylococcus aureus* 52–34, erythromycin-carbomycin-tetracycline resistant | 3.12 |
| *Staphylococcus aureus* 193, parent | 3.12 |
| *Staphylococcus aureus* 193, erythromycin resistant | 1.56 |
| *Staphylococcus aureus* Smith | 3.12 |
| *Micrococcus flavus* 16 | <0.78 |
| *Bacillus anthracis* | 3.12 |
| *Sarcina lutea* PCI 219 | 0.78 |
| *Bacillus subtilis* PCI 219 | 6.25 |
| *Staphylococcus aureus* Terajima | 3.12 |
| *Mycobacterium* 607 | >100.00 |
| *Escherichia coli* NIHJ | >100.00 |
| *Pseudomonas aeruginosa* A3 | >100.00 |
| *Serratia marescens* | >100.00 |
| *Proteus vulgaris* OX 19 | >100.00 |
| *Klebsiella pneuntoniae* PCI 602 | >100.00 |
| *Shigella flexneri* 1a Ew 8 | >100.00 |

Antifungal activity of laspartomycin (on 1% glucose-nutrient agar medium, at 27° C. for 20–40 hrs.):

| Test organisms: | Minimum inhibitory concentration mcg./cc. |
|---|---|
| Cladosporium spharosperum | 25.0 |
| Colletotrichum phomoides | 12.5 |
| Fusarium roseum | 50.0 |
| Fusarium lini | >100.0 |
| Gibberella fujikuroi | 12.5 |
| Gloeosporium kaki | 12.5 |
| Glomerella laginarium | 100.0 |
| Helminthosporium sesameum | 25.0 |
| Ophiobolus miyabeanus | 50.0 |
| Pellicularia filamentosa (Sasaki) | 6.25 |
| Piricularia grisea | 12.5 |
| Schlerotium rofsii | 12.5 |
| Alternaria kikuchiana | 12.5 |
| Xanthomonas oryzae | >100.0 |
| Absidia spinosa | >100.0 |
| Candida tropicalis | 100.0 |
| Candida pseudotropicalis | >100.0 |
| Candida YU–1200 | >100.0 |
| Candida albicans 3147 | >100.0 |
| Candida krusei | >100.0 |
| Saccharomyces cerevisiae | >100.0 |
| Torula utilis 4001 | 6.25 |
| Botrytis bassiana | >100.0 |
| Cryptococcus neoformans | 3.12 |
| Fusarium oxysporium | >100.0 |
| Pseudomonas fluorescens | >100.0 |
| Helminthosporium oryzae | 25.0 |
| Trichophyton mentagrophytes 598 | 50.0 |
| Trichophyton asteroides | 50.0 |
| Aspergillus niger | >100.0 |
| Penicillium chrysogenum 49–133 | 25.0 |
| Penicillium lilacinum 8021 | >100.0 |
| Piricularia oryzae | 6.25 |

Among known antibiotics which are active to Gram positive bacteria and acidic or amphoteric peptides, aspartocin (Antibiotic Annual, 1959–1960, p. 194), amphomycin (Antibiotics and Chemotherapy, 3, 1239, 1953), zaomycin (Journal of Antibiotics, 7A, 134, 1954), glumamycin (Journal of Antibiotics, 15A, 1, 1962) and crystallomycin (Antibiotiki, 2(6), 9, 1957) are most related to laspartomycin. Authentic samples of amphomycin, glumamycin were differentiated from laspartomycin by ascending paper chromatography. Rf values of amphomycin, glumamycin and laspartomycin detected by bioautography are 0.15, 0.03, 0.070 with solvent system of benzene-methanol (4:1), 0.07, 0.05, 0.45 with n-butanol saturated with water, and 0.15, 0.10, 0.41 with 1-butanol-pyridine-water (2:1:1) respectively. They are also differentiated by thin-layer chromatography of silica gel. Rf values of amphomycin, glumamycin, and laspartomycin detected by decolorization of permanganate and bioautography are 0.03, 0.03, 0.14 with 1-butanol saturated with water, 0.026, 0.020, 0.13 with acetic acid-chloroform (2:1), 0.35, 0.44, 0.58 with 1-butanol-acetic acid-water (4:1:2) respectively. According to the description in Antibiotics Annual, 1959–1960, p. 194, aspartocin moved 1 inch and amphomycin did 6–7 inches when they are developed on paper chromatography using 5% ammonium chloride in water. When amphomycin and laspartomycin were compared on the same paper chromatography as above, Rf values of the former and the latter were closely similar to each other (0.26 and 0.23 respectively). In this respect, laspartomycin having similar Rf value to amphomycin can be differentiated from aspartocin having different Rf value. In addition, aspartocin can be differentiated from laspartomycin in the respects that their $[\alpha]_D$ are different. And the acid hydrolysate of aspartocin does not contain isoleucine. From the above results, laspartomycin can be clearly differentiated from aspartocin and amphomycin. Zaomycin has been described by Shibata et al. (J. of Antibiotics, 15A, 1, 1962) to remain at the spotted position on paper chromatography with 1-butanol saturated water and benzene-methanol (4:1) and can be differentiated from laspartomycin, which moves at Rf 0.45 and 0.70, respectively. Crystallomycin has been described to contain no isoleucine but to contain glutamic acid. Thus, laspartomycin was different from all known antibiotics.

The following are the examples, but they are merely illustrative and modification of the processes in this invention can be easily done, based on known conditions for cultivation of actinomycetes and on properties of laspartomycin. It should be understood that the present invention includes all such modification and is not restricted by the examples.

EXAMPLE 1

A medium consisting of starch, 1%, glucose 1%, soybean meal (Prorich, product of Ajinomoto Co., Tokyo) 1.5%, $K_2HPO_4$ 0.1%, $MgSO_4 \cdot 7H_2O$ 0.1% and NaCl 0.3% was prepared. The above medium of 125 cc. was sterilized in shaking flask of 500 cc. volume at 120° C. for 20 minutes and cooled. The strain M307–M5 on the agar slant was inoculated to the above sterilized medium and shake-cultured at 27–29° C. on reciprocal shaking machine (120 strokes per minute, 8 cm. amplitude). After 48 hrs.' culture 2 cc. of the fermented beer was inoculated to a new medium prepared as above (total, 72 flasks). The fermented beer in 72 flasks at 10 days' culture were collected and combined and filtered (7600 cc.). The pH of the filtrate was 7.8 and the filtrate contained the antibiotic at 100 mcg./cc., when it was measured by Micrococcus flavus cup method. The filtrate was adjusted to pH 2 by hydrochloric acid and 100% of its activity was extracted with butanol of 5 l. After washing solvent layer with small amounts of water to remove acid, butanol layer was concentrated in vacuo to 100 cc. To this concentrate, same volume of water was added and the activity was transferred to the aqueous solution by adjusting its pH to 10 with sodium hydroxide. After repeating this procedure twice, 90% of the activity was recovered in aqueous layer. The aqueous layer was adjusted to pH 2 and added with butanol. Repeated extraction yielded 90% of the activity in butanol layer. After washed with water, the solvent layer was concentrated in vacuo and dried. Crude powder of 26 g. (purity 22%) was obtained. The yield was calculated to be 75% of the filtrate.

This crude powder was subjected to countercurrent extraction which employed 34 tubes and solvent system of chloroform:methanol:N/50—HCl (2:1:1). The upper and lower layer consists of 50 cc. each. The activity was found in the lower layer of 27–34 tubes. These active fractions were combined and assayed. One hundred percent of the activity in the crude powder was found in the combined solution. The solution was concentrated and dissolved in 10 cc. of methanol. The methanol solution was applied to a column (1.2 x 3.5 cm.) filled with 30 g. of neutral alumina. The elution was made by 50 cc. of methanol and 80% aqueous methanol containing 0.5 N ammonia. The activity was mainly in the eluate by ammoniacal methanol and 1.05 g. of crude powder (purity 72%) was obtained.

EXAMPLE 2

The powder of 380 mg. obtained in Example 1 was applied to a column (1.3 x 30 cm.) filled with 10 g. of silica gel and eluted with 1-butanol saturated with water. Laspartomycin was eluted after colored impurity. White powder of 268 mg. (purity about 100%) was obtained from the active eluate. This powder (199 mg.) was dissolved in 30 cc. of 1-butanol. The butanol solution was washed with 30 cc. of water, of which pH was adjusted to 9.6 by sodium hydroxide, and with 30 cc. of water of which pH was adjusted to pH 2 by hydrochloric acid, and finally with water. The solvent layer was concentrated to dryness. One hundred seventy mg. of free acid of laspartomycin (100% purity) was obtained.

EXAMPLE 3

As shown in Table 1, various combinations of nitrogen and carbon sources were added to the basal medium consisting of NaCl 0.2%, $MgSO_4 \cdot 7H_2O$ 0.1%, $K_2HPO_4$ 0.1% and yeast extract 0.2%, and 16 kinds of various media were prepared in flask of 500 cc. volume. As shown in Table 2, the activity in fermented broth at 72–192 hrs. of the shaking culture were assayed by *Micrococcus flavus* cup method.

50 cc. of water at pH 9 adjusted by NaOH and another 50 cc. at pH 2 adjusted by HCl. The butanol layer was further washed with water to remove hydrochloric acid and 1.283 g. of laspartomycin (free acid) was obtained. This powder was dissolved in 50 cc. of methanol and treated with active carbon to yield 1.265 g. of most purified laspartomycin.

We claim:

1. Laspartomycin characterized as follows: being a colorless powder, being soluble in water and lower alcohols and scarcely soluble in esters, acetone, benzene and ether, exhibits decomposition at approximately 199° C.,

TABLE 1

| No. of medium | Composition in medium, percent | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Glycerin | 2 | 2 | 2 | 2 | | | | | | | | | | | | |
| Glucose | | | | | 2 | 2 | 2 | 2 | | | | | | | | |
| Starch | | | | | | | | | 1.0 | 1.0 | 1.0 | 1.0 | | | | |
| Glucose | | | | | | | | | 1.0 | 1.0 | 1.0 | 1.0 | | | | |
| Lactose | | | | | | | | | | | | | 2 | 2 | 2 | 2 |
| Prorich (Ajinomoto Co.) | | 2 | | | | 2 | | | | 2 | | | | 2 | | |
| Soy meal (Nisshin Co.) | | | 2 | | | | 2 | | | | 2 | | | | 2 | |
| Corn steep liquor | 2 | | | | | 2 | | | | | | 2 | | | | 2 |
| Meat extract | | | | 0.8 | | | | 0.8 | | | | 0.8 | | | | 0.8 |
| Peptone | | | | 0.8 | | | | 0.8 | | | | 0.8 | | | | 0.8 |

Note.—Basal media: NaCl 0.2%, $MgSO_4 \cdot 7H_2O$ 0.1%, $K_2HPO_4$ 0.1%, yeast extract 0.2%.

TABLE 2

| No. of medium | 72 hrs. | | 96 hrs. | | 120 hrs. | | 144 hrs. | | 168 hrs. | | 192 hrs. | |
|---|---|---|---|---|---|---|---|---|---|---|---|---|
| | pH | γ/cc. | pH | γ/cc. | pH | γ/cc. | pH | γ/cc. | pH | γ/cc. | pH | γ/cc. |
| 1 | 6.4 | 0 | 6.4 | 76 | 6.2 | 108 | 6.2 | 115 | 6.8 | 450 | 7.4 | 450 |
| 2 | 6.2 | 160 | 6.2 | 270 | 7.4 | 325 | 7.6 | 320 | 7.6 | 400 | 7.6 | 450 |
| 3 | 6.2 | 120 | 6.2 | 155 | 6.2 | 180 | 7.0 | 250 | 7.2 | 420 | 7.4 | 400 |
| 4 | 6.8 | 50 | 6.0 | 125 | 6.8 | 380 | 7.4 | 260 | 7.4 | 320 | 7.4 | 300 |
| 5 | 5.8 | 0 | 6.2 | 92 | 6.2 | 160 | 5.8 | 305 | 5.2 | 320 | 5.0 | 280 |
| 6 | 5.0 | 0 | 6.2 | 0 | 7.2 | 155 | 7.6 | 100 | 7.6 | 115 | 7.6 | 140 |
| 7 | 6.2 | 70 | 5.2 | 92 | 6.8 | 160 | 7.2 | 160 | 7.4 | 180 | 7.4 | 180 |
| 8 | 5.8 | 85 | 5.0 | 132 | 6.0 | 280 | 7.4 | 210 | 7.6 | 250 | 6.6 | 250 |
| 9 | 5.0 | 50 | 5.6 | 95 | 5.8 | 170 | 6.2 | 220 | 6.6 | 250 | 7.2 | 320 |
| 10 | 5.8 | 58 | 6.0 | 110 | 7.2 | 155 | 7.4 | 180 | 7.6 | 180 | 7.6 | 190 |
| 11 | 5.2 | 0 | 5.4 | 40 | 6.2 | 144 | 7.2 | 170 | 7.4 | 250 | 7.4 | 250 |
| 12 | 5.0 | 0 | 5.6 | 140 | 6.8 | 95 | 7.6 | 320 | 7.6 | 360 | 7.8 | 340 |
| 13 | 6.2 | 0 | 6.4 | 0 | 6.2 | 120 | 6.2 | 115 | 6.2 | 170 | 6.4 | 150 |
| 14 | 7.0 | 65 | 7.0 | 105 | 7.2 | 100 | 7.4 | 130 | 7.6 | 190 | 7.8 | 180 |
| 15 | 7.4 | 50 | 7.2 | 58 | 7.0 | 132 | 7.0 | 220 | 6.2 | 250 | 6.8 | 350 |
| 16 | 7.6 | 52 | 7.8 | 96 | 7.8 | 95 | 7.8 | 95 | 7.8 | 115 | 7.6 | 70 |

EXAMPLE 4

As same procedure as described in Example 1, 7.5 l. of broth filtrate and its mycelium were extracted with 1-butanol. The butanol extract (5180 cc.) was transferred into water (5100 cc.) at pH 10, and laspartomycin in the water layer was quantitatively re-extracted with 2660 cc. of 1-butanol at pH 2. The butanol solution was concentrated under reduced pressure to dryness. To the residue 10 volumes of ethyl acetate was added and laspartomycin was precipitated. Crude powder (3.69 g., purity 67%) was obtained. Methanol solution (methanol:water=4:1) of this powder was passed through a column (2 x 26 cm.) containing alumina (60 g.) and the elution was performed with ammoniacal methanol (methanol:0.1 N $NH_4$=4:1). The active eluate was concentrated and dried in vacuo to yield 2.26 g. of yellowish powder (purity 98%). The further purification was made by a column (3 x 24 cm.) chromatography using 70 g. of silica gel (product of Kanto Chemical Co., Tokyo) and the mixture of $CHCl_3$-MeOH-$H_2O$-Ethylacetate (10:4:0.7:4) as the developing solvent. Active eluate was concentrated and dried in vacuo giving 1.65 g. of powder (purity about 100%). The powder was dissolved in 50 cc. of 1-butanol and the solution was washed with exhibiting no absorption maximum in the ultraviolet spectrum except end absorption, giving weakly positive ninhydrin and biuret reactions, but negative Molisch and anthrone, having an isoelectric point at about pH 2.6, showing levorotation ($[\alpha]_D^{20°}$ in methanol of approximately $-17.5°$), being an acidic peptide and the formula of $C_{82}H_{137-139}N_{17}O_{29}$ is roughly suggested by the amino acid analysis and the titration equivalent (about 455), having a molecular weight 1825–1827, giving Rf value of 0.70 on paper chromatography using benzene-methanol (4:1), inhibiting growth of Gram positive bacteria, having low toxicity to mice, preventing infection of staphylococci in mice, and exhibits characteristic absorption bands in the infrared absorption spectrum when mulled in potassium bromide at the following frequencies in cm.$^{-1}$: 3330, 3060, 2940, 1730, 1660, 1530, 1440, 1340, 1230, 1175, 1025, 1005, 980, 925, 870 and 850.

2. A process for the production of laspartomycin, which comprises cultivating a strain of *Streptomyces viridochromogenes* var. *komabensis* NIHJ No. MC–5–42, in an aqueous carbohydrate solution containing a nitrogenous nutrient under submerged aerobic condition until substantial antibacterial activity is imparted to said solution and then recovering said laspartomycin from said solution.

3. A process claimed in claim 2 wherein the antibiotic laspartomycin is recovered by extraction with lower alcohol of $C_1$–$C_4$.

4. A process as claimed in claim 2 wherein the antibiotic laspartomycin in the aqueous solution is recovered in the form of precipitate by adjusting pH to about 2.6 with hydrochloric acid.

References Cited

UNITED STATES PATENTS 3,021,259  2/1962  Celmer et al. _____ 424—118

JEROME D. GOLDBERG, Primary Examiner

U.S. Cl. X.R.

195—80